United States Patent
Burgess et al.

(10) Patent No.: US 11,740,986 B2
(45) Date of Patent: *Aug. 29, 2023

(54) SYSTEM AND METHOD FOR AUTOMATED DESKTOP ANALYTICS TRIGGERS

(71) Applicant: Verint Americas Inc., Alpharetta, GA (US)

(72) Inventors: Senan Burgess, Alpharetta, GA (US); Chris Schnurr, Alpharetta, GA (US)

(73) Assignee: Verint Americas Inc., Alpharetta, GA (US)

( * ) Notice: Subject to any disclaimer, the term of this patent is extended or adjusted under 35 U.S.C. 154(b) by 91 days.

This patent is subject to a terminal disclaimer.

(21) Appl. No.: 17/401,825

(22) Filed: Aug. 13, 2021

(65) Prior Publication Data

US 2021/0374026 A1 Dec. 2, 2021

Related U.S. Application Data

(63) Continuation of application No. 16/686,733, filed on Nov. 18, 2019, now Pat. No. 11,093,359.

(60) Provisional application No. 62/768,272, filed on Nov. 16, 2018.

(51) Int. Cl.
| | | |
|---|---|---|
| *G06F 11/30* | (2006.01) | |
| *G06F 11/34* | (2006.01) | |
| *G06N 5/00* | (2023.01) | |
| *G06N 20/00* | (2019.01) | |

(Continued)

(52) U.S. Cl.
CPC ............ *G06F 11/30* (2013.01); *G06F 9/48* (2013.01); *G06F 11/301* (2013.01); *G06F 11/3003* (2013.01); *G06F 11/3006* (2013.01); *G06F 11/3065* (2013.01); *G06F 11/3068* (2013.01); *G06F 11/3072* (2013.01); *G06F 11/34* (2013.01); *G06F 11/3447* (2013.01); *G06F 11/3452* (2013.01); *G06N 5/00* (2013.01); *G06N 20/00* (2019.01); *G06Q 10/06* (2013.01); *G06F 2201/86* (2013.01)

(58) Field of Classification Search
CPC .. G06F 11/30; G06F 11/3003; G06F 11/3006; G06F 11/301; G06F 11/3065; G06F 11/3068; G06F 11/3072; G06F 11/34; G06F 11/3447; G06F 11/3452; G06F 9/48; G06F 2201/86; G06Q 10/06; G06N 4/00; G06N 20/00
See application file for complete search history.

(56) References Cited

U.S. PATENT DOCUMENTS

| | | |
|---|---|---|
| 2007/0276715 A1 | 11/2007 | Beringer et al. |
| 2014/0143026 A1 | 5/2014 | Nies et al. |
| 2015/0242769 A1 | 8/2015 | Kezeu |

(Continued)

*Primary Examiner* — Charles M Swift
(74) *Attorney, Agent, or Firm* — Christopher M. Scherer; Erin Ella Block; DeWitt LLP (57) ABSTRACT

The present invention is a method and system for automatedly producing at least one desktop analytics trigger. Upon receiving at least one type of data input, the system analyzes the data input and produces at least one desktop analytics trigger based on the results of the analysis of the data input. The data input can include data on the programs, applications, or information a user utilizes during a task, to allow use of desktop process analytics. This process may be used to either generate a new desktop analytics trigger or update an existing desktop analytics trigger.

17 Claims, 4 Drawing Sheets

(51) Int. Cl.
*G06F 9/48* (2006.01)
*G06Q 10/06* (2023.01)

(56) References Cited

U.S. PATENT DOCUMENTS

2015/0288592 A1   10/2015  Baughman et al.
2019/0237083 A1    8/2019  Allen et al.
2019/0370146 A1*  12/2019  Babu .................. G06F 11/3089

* cited by examiner

SYSTEM AND METHOD FOR AUTOMATED DESKTOP ANALYTICS TRIGGERS

CROSS-REFERENCE TO RELATED APPLICATIONS

This application is a continuation of U.S. patent application Ser. No. 16/686,733, filed Nov. 18, 2019, which application claims the benefit of prior-filed, U.S. Provisional Patent Application 62/768,272 filed on Nov. 16, 2018, the contents of which are incorporated herein by reference in their entireties.

BACKGROUND

The present disclosure is directed to a method for computer analysis, specifically a method for configuring desktop analytics.

Currently desktop analytics triggers are manually configured and do not apply retroactively. Such triggers are often used to visualize and optimize business processes. Unfortunately, triggers need to be set up and maintained. This maintenance must be done by personnel who are not only trained in Desktop Process Analytics (DPA) but also have significant customer business knowledge and significant knowledge of "shop floor" applications and processes within the customer site.

This takes time for customer service personnel to attain this level of knowledge, as the personnel must be trained to attain this level of knowledge at each customer site. This time is expensive. Delays due to training time delay time to value and also prevent the customer from realizing the return on investment of a fully integrated DPA solution.

SUMMARY

An exemplary embodiment of the present application is a method for automatedly producing at least one desktop analytics trigger. The method receives at least one type of data input, analyzes the data input, and produces at least one desktop analytics trigger based on the results of the analysis of the data input. The data input comprises data on the programs, applications, or information a user utilizes during a task.

Another exemplary embodiment of the present application is a system for automatedly producing at least one desktop analytics trigger. The system includes a processor and a non-transitory computer readable medium programmed with computer readable code that upon execution by the processor causes the processor to execute the above-mentioned method for automatedly producing at least one desktop analytics trigger.

Another exemplary embodiment of the present application is a non-transitory computer readable medium programmed with computer readable code that upon execution by a processor causes the processor to execute the above-mentioned method for automatedly producing at least one desktop analytics trigger.

The objects and advantages will appear more fully from the following detailed description made in conjunction with the accompanying drawings.

DETAILED DESCRIPTION

In the present description, certain terms have been used for brevity, clearness and understanding. No unnecessary limitations are to be applied therefrom beyond the requirement of the prior art because such terms are used for descriptive purposes only and are intended to be broadly construed. The different systems and methods described herein may be used alone or in combination with other systems and methods. Various equivalents, alternatives and modifications are possible within the scope of the appended claims. Each limitation in the appended claims is intended to invoke interpretation under 35 U.S.C. § 112, sixth paragraph, only if the terms "means for" or "step for" are explicitly recited in the respective limitation.

Currently desktop analytics triggers are manually configured and do not apply retrospectively. Such triggers are often used to visualize and/or optimize business processes. Automated desktop analytics triggers are suggested by the system, saving the process analyst time and effort, but also increasing scalability and reducing time to value. These triggers are not only automatically recognized and created, but can also apply retrospectively to historical desktop analytics data, meaning data can be reprocessed with each new analytics trigger is developed.

DPA can store significant information through detection of application windows and other desktop behavior. Desktop analytics triggers can be automatedly defined on this data. Data mining and machine learning based algorithms may be used to identify patterns, i.e. how users pass through these trigger points in the course of their work. These patterns show how users are actually performing processes through the desktop. The system presents these patterns to the user as specific desktop analytics triggers. The user marks patterns as relevant or not relevant for a process i.e. where part of the process, a variation of it, or not part of the process. This feedback (supervised learning) is taken into account by the system when it next reviews historical data. Through this iterative process, accurate process workflows (based on how users are actually performing the work) are built up and displayed, with edits and/or corrections being fed back to the system to be taken into account for future reviews of user process usage.

A central or distributed analytics engine (AE) is configured to constantly receive and analyze data within the system to suggest appropriate desktop analytics triggers. Analysis may be a real-time analysis of streaming data or batch analysis of data. The AE includes at least one set of analytics rules used to analyze data. The analytics rules determine the desktop analytics triggers developed and/or suggested. Analytics rules may be static or may be dynamically updated by the AE and/or a user or third party utilizing a desktop or system input. Updates may be manual and/or automatic. Automatic updates to analytics rules may be triggered by meeting certain criteria within the analytics rules of the AE or within other system modules, or may occur at predetermined intervals. Analytics rules may be software programs or separate files executed by a software program.

Figure 1:
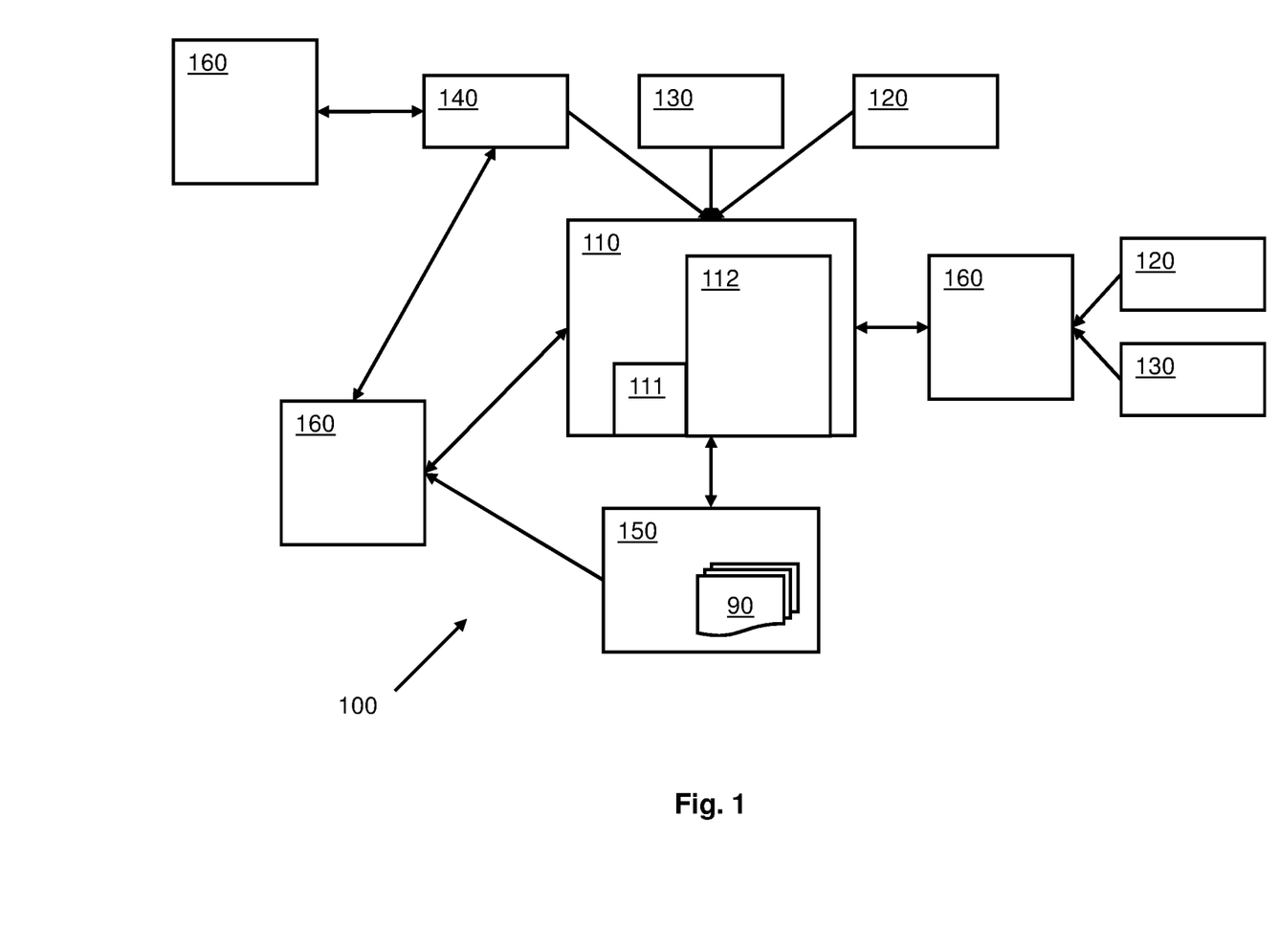
FIG. 1 depicts an exemplary embodiment of a desktop analytics system for creating analytics triggers.

FIG. 1 depicts an exemplary embodiment of an analytics system 100 for creating at least one desktop analytics trigger 90. Analytics system 100 includes an analytics engine 110 which receives input from at least one base data source 120, feedback data source 130, and/or external system 140 to produce at least one analytics trigger 90. Production of the analytics trigger 90 may entail generating a new analytics trigger 90 and/or updating an existing analytics trigger 90. An optional analytics trigger database 150 allows storage of analytics triggers 90. A desktop 160 allows additional input to analytics engine 110 as well as display of analytics triggers 90 and any data used. At least one additional desktop 160 may be the source of at least some of the base data 120.

The analytics engine 110 is configured to receive and analyze data within analytics system 100. Analysis may be a real-time analysis of streaming data or batch analysis of data. The analytics engine 110 includes at least one set of analytics rules 111 used to analyze data. The analytics rules 111 determine responses to information extracted from base data and/or feedback data, creating analytics trigger 90. The analytics rules 111 may incorporate data mining and/or machine learning algorithms. The analytics rules 111 may be static or may be dynamically updated by analytics engine 110, external system 140, and/or an employee or third party utilizing desktop 160. Updates may be manual or automatic. Automatic updates to analytics rules 111 may be triggered by meeting certain criteria within analytics rules 111 of analytics engine 110 or within external system 140, or may occur at predetermined intervals. The analytics rules 111 may be software programs or separate files executed by a software program.

In certain embodiments, the analytics engine 110 also includes analytics memory 112. The analytics memory 112 can store analytics triggers 90, data used for analysis, the results of that analysis, analytics rules 111, or any other information or data used by analytics system 100.

While the exemplary embodiment includes one analytics engine 110, analytics system 100 may include more analytics engines 110. In embodiments with multiple analytics engines 110, analytics engines 110 may be constantly connected, periodically connected, interconnected through at least one external system 140, analytics trigger database 150, and/or desktop 160, or separate. In embodiments with a single analytics engine 110, analytics engine 110 is connected, directly or indirectly, to all external systems 140, analytics trigger databases 150, and/or desktops 160.

The external systems 140 may be connected to analytics engine 110, other external systems 140, analytics trigger databases 150, and/or desktops 160. In certain embodiments, some external systems 140 connect analytics engine 110 to certain other external systems 140 and/or analytics trigger databases 150. The external systems 140 provide different data and/or functionalities to analytics system 100, and may include one or more desktops 160. The external systems 140 may be one or more external systems 140 for a single client, or multiple external systems 140 for multiple different clients. By way of non-limiting example, external system 140 may be an email system, texting system, telephone system, Internet access system, and/or another system used in customer interaction. By way of another non-limiting example, external system 140 may be a customer service protocol database, work resource system, human resources system, internal work system, scheduling and/or calendaring system, and/or another system internal to at least one client's business.

A single external system 140 may perform multiple processes, a single process, and/or part of a larger process. In embodiments with multiple analytics engines 110, each analytics engine 110 may be connected to a unique set of external systems 140 or may share all or some specific external systems 140. By way of non-limiting example, each analytics engine 110 may be connected to a different client's set of external systems 140. External systems 140 can be updated by adding, updating, or removing specific external systems 140. The connections between analytics engines 110, external systems 140, analytics trigger databases 150, and desktops 160 may also be updated.

The external system 140 may also provide input from base data source 120 and feedback data source 130 to analytics engine 110 for analysis, or may analyze such data and apply the results directly. By way of non-limiting example, external systems 140 may perform analytics relating to usage of desktop 160 or other available resources, and any other analysis related to how users pass through trigger points in the course of their work. The external systems 140 may provide the results of such analyses to analytics engine 110 or to other external systems 140. By way of further non-limiting example, external systems 140 may also interact with the functions of desktop 160. Such interactions may allow another desktop 160 to observe and/or share another desktop 160, and utilize, update, or transmit or retrieve information to or from certain functions of the desktop 160.

The analytics trigger databases 150 are connected to analytics engine 110 and may be connected to other analytics trigger databases 150 and/or external systems 140. The analytics trigger databases 150 store analytics triggers 90 for use by analytics system 100 and system users. System users can include employees to whom analytics triggers 90 are directed, and HR and/or supervisory staff. By way of non-limiting example, analytics trigger databases 150 may store standardized and/or pregenerated analytics triggers 90 for basic use of standardized desktops 160, various iterations of specific analytics triggers 90, analytics triggers 90 for a specific client, and/or any combination thereof. The analytics triggers 90 stored in analytics trigger databases 150 may be categorized by client, date created and/or updated, business division, applicable system and/or program, purpose, or any other possible classification schema. The analytics trigger databases 150 can be updated by adding, changing, or removing analytics triggers 90. The connections between analytics engine 110, external systems 140, and analytics trigger databases 150 may also be updated.

The desktop 160 provides input from base data source 120 or feedback data source 130. By way of non-limiting example, the input from base data source 120 may include process and/or pattern data on the programs, applications, or information a user utilizes during a task such as a customer interaction, the order in which they are utilized, the time spent utilizing them, specific sub-programs or databases, and the like. By way of non-limiting example, the input from feedback data source 130 may include relevance of a pattern to a process and/or larger pattern, or addition of a pattern to a process and/or larger pattern.

The desktop 160 also receives and displays analytics triggers 90 from analytics trigger databases 150 and/or analytics engines 110 to obtain feedback data from feedback data source 130. Processes from external systems 140 may also interact with the processes of desktop 160. By way of non-limiting example, an external system 140 may receive base data on application usage from base data source 120 in desktop 160, perform a full or partial analysis on the data, and provide the data and/or analysis results to the analytics engine 110. Optionally, desktop 160 may also be used to modify analytics rules 111 or submit a request to analytics engine 110.

Figure 2A:
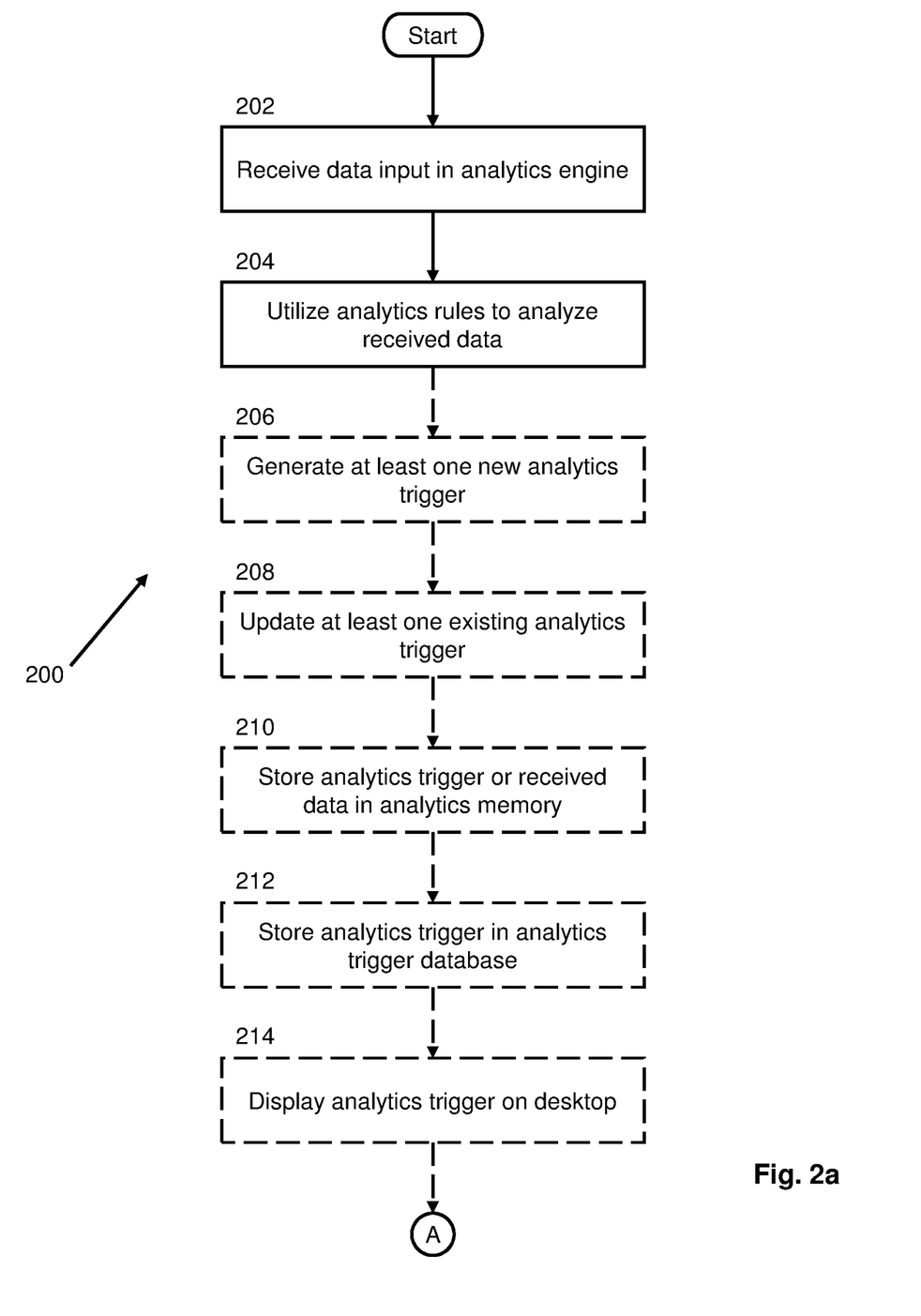
FIGS. 2a and 2b depict a flowchart of an exemplary embodiment of a method for creating analytics triggers.
Figure 2B:
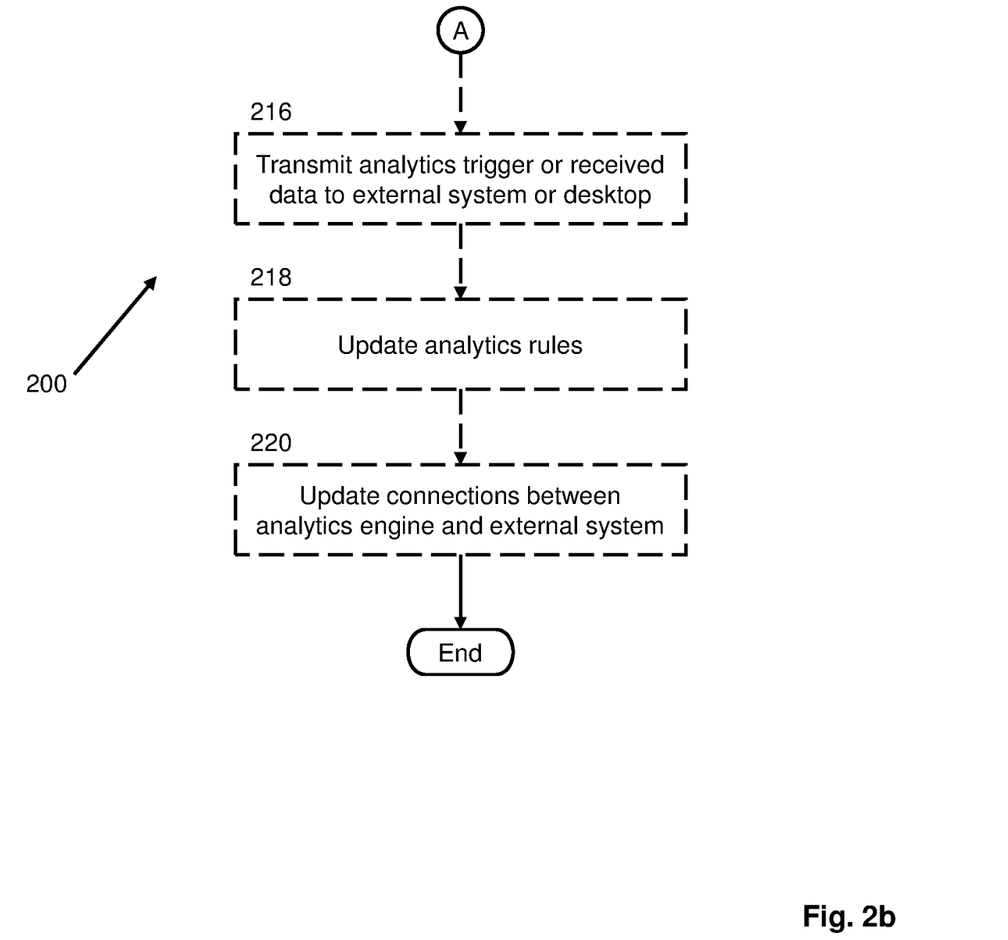

FIGS. 2a and 2b depict a flowchart of an exemplary embodiment of a method 200 for creating and modifying analytics trigger 90. It should be understood that the arrangement of the steps of method 200 may be reordered and/or certain steps performed simultaneously as long as the fundamental function of method 200 remains unaltered.

In step 202, the analytics engine 110 of the analytics system 100 receives data input from at least one base data source 120, feedback data source 130, and/or input from at least one external system 140.

In step 204, the analytics engine 110 utilizes at least one set of analytics rules 111 to analyze received data. This analysis may be a real-time analysis of streaming data or batch analysis of data.

In optional step 206, the analytics engine 110 generates at least one new analytics trigger 90 utilizing the results of the analysis of step 204.

In optional step 208, the analytics engine 110 updates at least one existing analytics trigger 90 utilizing the results of the analysis of step 204.

In optional step 210, analytics system 100 stores at least one of the analytics trigger 90 or received data in the analytics memory 112.

In optional step 212, analytics system 100 stores at least one analytics trigger 90 in the analytics trigger database 150.

In optional step 214, analytics system 100 displays at least one analytics trigger 90 on at least one desktop 160.

In optional step 216, the analytics system 100 transmits at least one of the analytics trigger 90 or received data to at least one external system 140 or at least one desktop 160.

In optional step 218, the analytics system 100 updates the analytics rules 111 of the analytics engine 110.

In optional step 220, the analytics system 100 updates the connections between analytics engine 110 and at least one external system 140. External systems 140 can be updated by adding, updating, or removing specific external systems 140.

It should be understood that method 200 may be divided into separate parts and practiced separately, and that steps of method 200 may be repeated as needed. By way of non-limiting example, steps 202, 204, and 206 may be run to create an analytics trigger, followed by steps 202, 204, and 208 repeated multiple times to update the existing analytics trigger multiple times.

Figure 3:
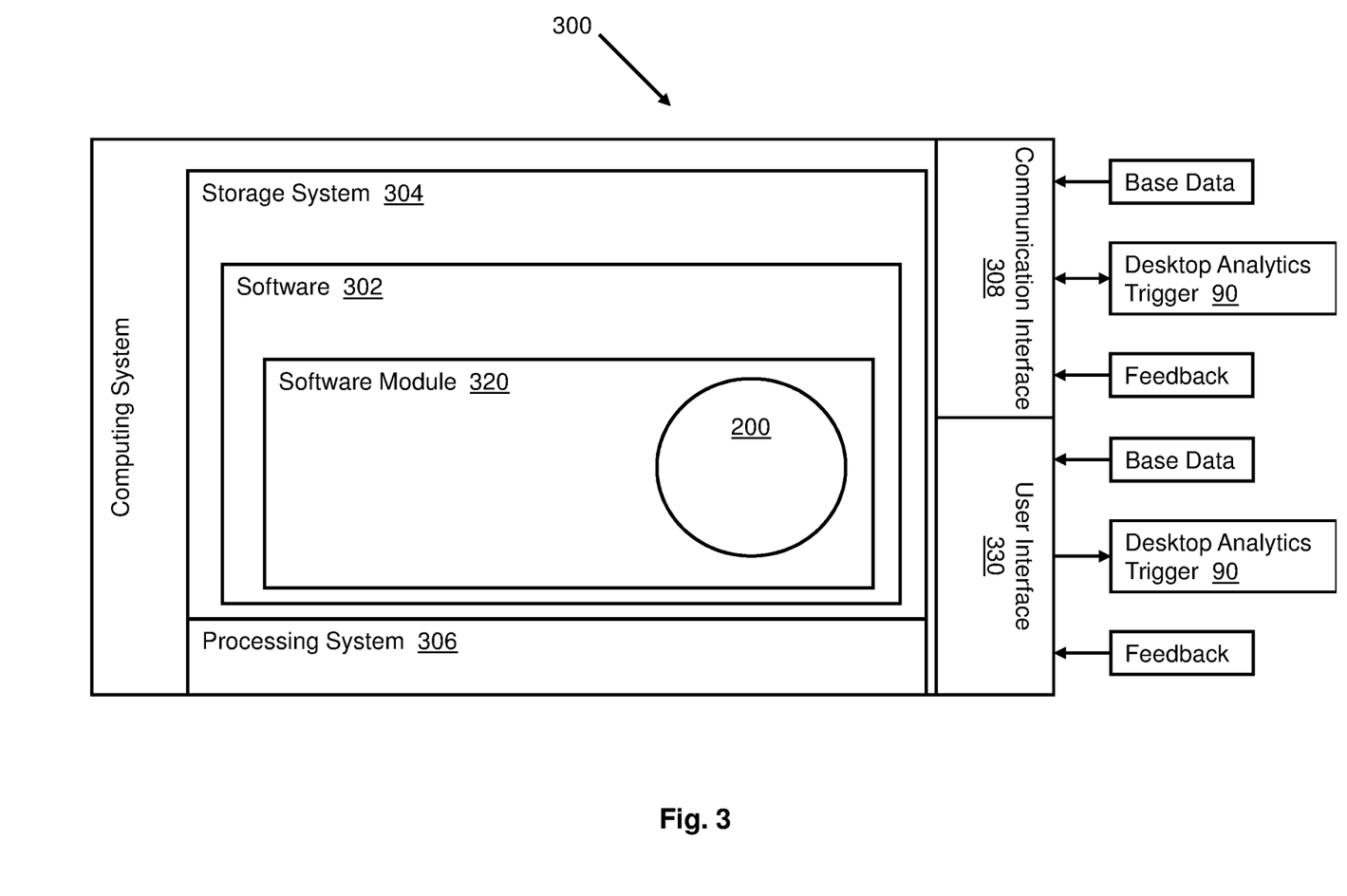
FIG. 3 depicts an exemplary embodiment of a computing system for performing the method for creating analytics triggers.

FIG. 3 depicts an exemplary embodiment of the computer system 300 used for configuring desktop analytics.

The system 300 is generally a computing system that includes a processing system 306, a storage system 304, software 302, a communication interface 308, and a user interface 310. The processing system 306 loads and executes software 302 from the storage system 304, including a software module 320. When executed by computing system 300, software module 320 directs the processing system 306 to operate as described in herein in further detail in accordance with the above program.

The computing system 300 includes a software module 320 for generating desktop analytics triggers 90. Although computing system 300 as depicted in FIG. 3 includes one software module 320 in the present example, it should be understood that more modules could provide the same operation. Similarly, while the description as provided herein refers to a computing system 300 and a processing system 306, it is to be recognized that implementations of such systems can be performed using one or more processors, which may be communicatively connected, and such implementations are considered to be within the scope of the description. It is also contemplated that these components of computing system 300 may be operating in a number of physical locations.

The processing system 306 can comprise a microprocessor and other circuitry that retrieves and executes software 302 from storage system 304. The processing system 306 can be implemented within a single processing device but can also be distributed across multiple processing devices or sub-systems that cooperate in existing program instructions. Examples of processing systems 306 include general purpose central processing units, application specific processors, and logic devices, as well as any other type of processing device, combinations of processing devices, or variations thereof.

The storage system 304 can comprise any storage media readable by processing system 306, and capable of storing software 302. The storage system 304 can include volatile and non-volatile, removable and non-removable media implemented in any method or technology for storage of information, such as computer readable instructions, data structures, program modules, or other information. The storage system 304 can be implemented as a single storage device but may also be implemented across multiple storage devices or sub-systems. The storage system 304 can further include additional elements, such a controller capable of communicating with the processing system 306.

Examples of storage media include random access memory, read only memory, magnetic discs, optical discs, flash memory, virtual memory, and non-virtual memory, magnetic sets, magnetic tape, magnetic disc storage or other magnetic storage devices, or any other medium which can be used to store the desired information and that may be accessed by an instruction execution system, as well as any combination or variation thereof, or any other type of storage medium. In some implementations, the storage media can be a non-transitory storage media. In some implementations, at least a portion of the storage media may be transitory. Storage media may be internal or external to system 300.

As described in further detail herein, computing system 300 receives and transmits data through communication interface 308. The data can include input data from base data source 120 or feedback data source 130, the analytics rules 111, or any other data that may pertain to the creation of desktop analytics triggers 90. In embodiments, the communication interface 308 also operates to send and/or receive information, such as, but not limited to, desktop analytics triggers 90, additional information to/from other systems to which computing system 300 is communicatively connected and/or any other information that may pertain to the creation of desktop analytics triggers 90.

The user interface 310 can include one or more of a mouse, a keyboard, a voice input device, a touch input device for receiving a gesture from a user, a motion input device for detecting non-touch gestures and other motions by a user, and/or other comparable input devices and associated processing elements capable of receiving user input from a user. Output devices such as a video display or graphical display can display analytics rules 111, desktop analytics triggers 90, or another interface further associated with embodiments of the system and method as disclosed herein. Speakers, printers, haptic devices and other types of output devices may also be included in the user interface 310. Users or other staff can communicate with computing system 300 through the user interface 310 in order to view the desktop analytics triggers 90 or analytics rules 111, enter or receive any other data or information, or any number of other tasks the user or other staff may want to complete with computing system 300.

In the foregoing description, certain terms have been used for brevity, clearness, and understanding. No unnecessary limitations are to be inferred therefrom beyond the requirement of the prior art because such terms are used for descriptive purposes and are intended to be broadly construed. The different configurations, systems, and method steps described herein may be used alone or in combination with other configurations, systems and method steps. It is to be expected that various equivalents, alternatives and modifications are possible within the scope of the appended claims.

What is claimed is:

1. A method for automatedly producing at least one desktop analytics trigger, comprising:
   receiving at least one type of data input, wherein the at least one data input is from a base data source and includes pattern data on the programs, applications, and information a user utilizes during a task, the order the programs, applications and information is utilized, and the time spent utilizing the programs, applications and information from the base data source;
   analyzing the data input based on a set of analytics rules to determine at least one desktop analytics trigger from the data input, wherein the analytics rules include machine learning techniques;
   producing at least one desktop analytics trigger based on the results of the analysis of the data input;
   receiving feedback on the at least one desktop analytics trigger from at least one feedback data input, wherein the feedback includes a relevance of the pattern data to a process; and
   modifying the at least one desktop analytics trigger based on the received feedback.

2. The method of claim 1, wherein the analytics rules include data mining techniques to determine how processes are being performed.

3. The method of claim 1, wherein the machine learning techniques identify patterns in the input data to determine how processes are being performed.

4. The method of claim 1, further comprising transmitting at least one of the at least one desktop analytics trigger or at least one type of data input to at least one external system or at least one desktop.

5. The method of claim 1, further comprising automatically modifying at least one desktop analytics trigger upon determination of a change to the data input from at least one base data source, at least one feedback data source, or at least one external system.

6. A system for automatedly producing at least one desktop analytics trigger, comprising:
   a processor; and
   a non-transitory computer readable medium programmed with computer readable code that upon execution by the processor causes the processor to execute a method for automatedly producing at least one desktop analytics trigger, comprising:
      receiving at least one type of data input, wherein the at least one data input is from a base data source and includes pattern data on the programs, applications, and information a user utilizes during a task, the order the programs, applications and information is utilized, and the time spent utilizing the programs, applications and information from the base data source,
      analyzing the data input based on a set of analytics rules to determine at least one desktop analytics trigger from the data input, wherein the analytics rules include machine learning techniques,
      producing at least one desktop analytics trigger based on the results of the analysis of the data input,
      receiving feedback on the at least one desktop analytics trigger from at least one feedback data input, wherein the feedback includes a relevance of the pattern data to a process, and
      modifying the at least one desktop analytics trigger based on the received feedback.

7. The system of claim 6, wherein the analytics rules include data mining techniques to determine how processes are being performed.

8. The system of claim 6, wherein the machine learning techniques identify patterns in the input data to determine how processes are being performed.

9. The system of claim 6, wherein the processor is further caused to transmit at least one of the at least one desktop analytics trigger or at least one type of data input to at least one external system or at least one desktop.

10. The system of claim 6, wherein the processor is further caused to modify at least one desktop analytics trigger upon determination of a change to the data input from at least one base data source, at least one feedback data source, or at least one external system.

11. The system of claim 6, wherein the processor is operatively coupled to at least one base data source, at least one desktop analytics trigger database, and at least one desktop.

12. The system of claim 11, wherein the at least one desktop analytics trigger database comprises a plurality of desktop analytics triggers.

13. A non-transitory computer readable medium programmed with computer readable code that upon execution by a processor causes the processor to execute a method for automatedly producing at least one desktop analytics trigger, comprising:
   receiving at least one type of data input, wherein the at least one data input is from a base data source and includes pattern data on the programs, applications, and information a user utilizes during a task, the order the programs, applications and information is utilized, and the time spent utilizing the programs, applications and information from the base data source,
   analyzing the data input based on a set of analytics rules to determine at least one desktop analytics trigger from the data input, wherein the analytics rules include machine learning techniques,
   producing at least one desktop analytics trigger based on the results of the analysis of the data input,
   receiving feedback on the at least one desktop analytics trigger from at least one feedback data input, wherein the feedback includes a relevance of the pattern data to a process, and modifying the at least one desktop analytics trigger based on the received feedback.

14. The non-transitory computer medium of claim 13, wherein the analytics rules include data mining techniques to determine how processes are being performed.

15. The non-transitory computer medium of claim 13, wherein the analytics rules machine learning techniques identify patterns in the input data to determine how processes are being performed.

16. The non-transitory computer medium of claim 13, wherein the executed method further comprises modifying at least one desktop analytics trigger upon determination of a change to the data input from at least one base data source, at least one feedback data source, or at least one external system.

17. The non-transitory computer medium of claim 13, wherein the executed method further comprises transmitting at least one of the at least one desktop analytics trigger or at least one type of data input to at least one external system or at least one desktop.

* * * * *